US011783246B2

(12) United States Patent
Lawrence et al.

(10) Patent No.: US 11,783,246 B2
(45) Date of Patent: Oct. 10, 2023

(54) SYSTEMS AND METHODS FOR WORKFORCE MANAGEMENT SYSTEM DEPLOYMENT

(71) Applicant: Talkdesk, Inc, San Francisco, CA (US)

(72) Inventors: Richard Lawrence, San Diego, CA (US); Jason Fama, San Carlos, CA (US)

(73) Assignee: Talkdesk, Inc., San Francisco, CA (US)

( * ) Notice: Subject to any disclaimer, the term of this patent is extended or adjusted under 35 U.S.C. 154(b) by 177 days.

(21) Appl. No.: 16/656,160

(22) Filed: Oct. 17, 2019

(65) Prior Publication Data
US 2021/0117905 A1  Apr. 22, 2021

Related U.S. Application Data

(63) Continuation of application No. 16/654,356, filed on Oct. 16, 2019.

(51) Int. Cl.
*G06Q 10/00* (2023.01)
*G06Q 10/0631* (2023.01)
(Continued)

(52) U.S. Cl.
CPC ... *G06Q 10/063114* (2013.01); *G06F 16/909* (2019.01); *G06Q 10/0633* (2013.01);
(Continued)

(58) Field of Classification Search
USPC ......... 379/265.02, 265.05, 221.01; 705/7.38, 705/7.11, 7.13, 7.27
See application file for complete search history.

(56) References Cited

U.S. PATENT DOCUMENTS 5,862,203 A   1/1999  Wulkan et al.
5,897,616 A   4/1999  Kanevsky et al.
(Continued)

FOREIGN PATENT DOCUMENTS

EP   1 418 519 A1   5/2004
JP   5986065 B2     9/2016
(Continued)

OTHER PUBLICATIONS

Ernst, A. T., et al. "An Annotated Bibliography of Personnel Scheduling and Rostering." (2003). (Year: 2003) (Year: 2003).*
(Continued)

*Primary Examiner* — Gurkanwaljit Singh
(74) *Attorney, Agent, or Firm* — Rimon PC; Marc. S. Kaufman

(57) ABSTRACT

A system for quickly deploying WFM systems in contact centers is provided. A user or administrator can quickly install a WFM application on a deployment server. The administrator can provide the WFM application access to the contact center data where the WFM application can import data from the contact center about one or more customers, agents, queues, teams, and any other items typically associated with contact centers. The imported data may also include presence data about the agents, teams, and customers. Based on the imported data, the WFM application may execute one or more workflows to automatically determine information such as maximum and minimum hours, break patterns, and shift data about the agents and teams.

17 Claims, 9 Drawing Sheets

(51) Int. Cl.
   *G06Q 10/1091* (2023.01)
   *H04W 4/029* (2018.01)
   *G06Q 10/0633* (2023.01)
   *G06Q 10/1093* (2023.01)
   *G06Q 30/0201* (2023.01)
   *G06Q 30/0202* (2023.01)
   *H04M 3/523* (2006.01)
   *G06F 16/909* (2019.01)

(52) U.S. Cl.
   CPC ... *G06Q 10/06312* (2013.01); *G06Q 10/1091* (2013.01); *G06Q 10/1097* (2013.01); *G06Q 30/0201* (2013.01); *G06Q 30/0202* (2013.01); *H04M 3/5233* (2013.01); *H04W 4/029* (2018.02); *H04M 2203/402* (2013.01)

(56) References Cited

U.S. PATENT DOCUMENTS

| | | |
|---|---|---|
| 5,966,691 A | 10/1999 | Kibre et al. |
| 5,970,124 A | 10/1999 | Csaszar et al. |
| 6,100,891 A | 8/2000 | Thorne |
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,345,093 B1 | 2/2002 | Lee et al. |
| 6,377,944 B1 | 4/2002 | Busey et al. |
| 6,385,584 B1 | 5/2002 | McAlister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 * | 3/2008 | Buonanno ............ G06Q 10/06 714/48 |
| 7,372,952 B1 | 5/2008 | Wu et al. |
| 7,382,773 B2 * | 6/2008 | Schoeneberger ....... H04L 67/10 379/265.09 |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 * | 2/2010 | Chahrouri ........... H04M 3/5232 379/265.06 |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 * | 11/2011 | Woodings ............ G06F 16/258 705/7.13 |
| 8,073,129 B1 * | 12/2011 | Kalavar ............ H04M 3/5233 379/265.12 |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 * | 11/2013 | Laredo ................ H04M 3/00 379/265.11 |
| 8,626,137 B1 | 1/2014 | Devitt et al. |
| 8,635,226 B2 | 1/2014 | Chang et al. |
| 8,644,489 B1 * | 2/2014 | Noble, Jr. ........... H04M 3/5175 379/265.03 |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 * | 8/2014 | Hackbarth ........ G06Q 10/06393 379/266.08 |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 * | 1/2015 | Noble, Jr. ............. G06Q 10/06 705/7.12 |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 * | 7/2015 | Etter ................ G06Q 10/06311 |
| 9,100,483 B1 * | 8/2015 | Snedden ............ H04M 3/5175 |
| 9,117,450 B2 | 8/2015 | Cook et al. |
| 9,123,009 B1 * | 9/2015 | Etter ................ G06Q 10/063116 |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,317,825 B2 | 4/2016 | Defusco et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,602,665 B1 | 3/2017 | Koster |
| 9,609,131 B2 | 3/2017 | Placiakis et al. |
| 9,674,361 B2 * | 6/2017 | Ristock ................ G06F 9/5027 |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,823,949 B2 * | 11/2017 | Ristock ................ G06F 9/5083 |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |

(56) References Cited

U.S. PATENT DOCUMENTS

| | | |
|---|---|---|
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Gordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B1 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,929,796 B1 | 2/2021 | Stepanov et al. |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1* | 9/2001 | Campbell ........... H04M 3/5191 379/265.09 |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1* | 7/2004 | Schoeneberger ... H04M 3/5233 370/352 |
| 2004/0162724 A1* | 8/2004 | Hill .................... G10L 15/1822 704/231 |
| 2004/0162753 A1 | 8/2004 | Vogel et al. |
| 2004/0174980 A1 | 9/2004 | Knott et al. |
| 2004/0215451 A1 | 10/2004 | Macleod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1* | 11/2006 | Pulaski ............... H04M 3/5183 379/265.06 |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0121903 A1 | 5/2007 | Moore, Jr. et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0211881 A1 | 9/2007 | Parker-Stephen |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0004933 A1 | 1/2008 | Gillespie |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1* | 12/2008 | Hamilton ............... G06Q 10/06 705/7.21 |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |

(56) References Cited

U.S. PATENT DOCUMENTS

| | | |
|---|---|---|
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1* | 10/2010 | Byrd ............... G06Q 10/10 704/275 |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1* | 3/2011 | Segev ............... G06Q 10/06 705/7.16 |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1* | 9/2011 | Laredo ............... H04M 3/00 379/265.13 |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vymenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0302301 A1 | 10/2015 | Petersen |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1* | 12/2015 | Steiner ............... G06Q 30/016 379/266.01 |
| 2015/0350442 A1 | 12/2015 | O'Connor et al. |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1* | 2/2016 | Korolev ............... H04M 3/5233 379/265.12 |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |

(56) References Cited

U.S. PATENT DOCUMENTS

| | | |
|---|---|---|
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 9/2016 | Thirugnanasundaram et al. |
| 2016/0295018 A1 | 10/2016 | Loftus et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0360336 A1 | 12/2016 | Gross et al. |
| 2016/0378569 A1* | 12/2016 | Ristock .............. H04M 3/523 718/104 |
| 2016/0381222 A1* | 12/2016 | Ristock .............. H04L 67/63 379/265.09 |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | Mccord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1* | 11/2017 | Kumar .............. H04M 3/5175 |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0083898 A1 | 3/2018 | Pham |
| 2018/0097910 A1 | 4/2018 | D'Agostino et al. |
| 2018/0114234 A1 | 4/2018 | Fighel |
| 2018/0121766 A1* | 5/2018 | McCord .............. G06N 3/08 |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0164259 A1 | 6/2018 | Liu et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0124202 A1 | 4/2019 | Dubey et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chisti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |

(56) References Cited

U.S. PATENT DOCUMENTS

| | | |
|---|---|---|
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0090570 A1 | 3/2021 | Aharoni et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2021/0201359 A1 | 7/2021 | Sekar et al. |
| 2021/0295237 A1 | 9/2021 | Taher et al. |
| 2021/0405897 A1 | 12/2021 | Hansalia |
| 2022/0129905 A1 | 4/2022 | Sethumadhavan et al. |
| 2023/0007123 A1 | 1/2023 | Krucek et al. |

FOREIGN PATENT DOCUMENTS

| | | |
|---|---|---|
| SU | 1732352 A1 | 5/1992 |
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Ernst, A. T., et al. "Staff scheduling and rostering: A review of applications, methods and models." European Journal of Operational Research 153 (2004): 3-27. (Year: 2004) (Year: 2004).*

Van den Bergh, Jorne, et al. "Personnel scheduling: A literature review." European journal of operational research 226.3 (2013): 367-385 (Year: 2013) (Year: 2013).*

Fukunaga, A., Hamilton, E., Fama, J., Andre, D., Matan, O., & Nourbakhsh, I. (2002). Staff scheduling for inbound call centers and customer contact centers. AI Magazine, 23(4), 30-40 (Year: 2002).*

Koole, Ger, and Auke Pot. "An overview of routing and staffing algorithms in multi-skill customer contact centers." (2006). (Year: 2006) (Year: 2006).*

Aldor-Noiman, Sivan, Paul D. Feigin, and Avishai Mandelbaum. "Workload forecasting for a call center: Methodology and a case study." The Annals of Applied Statistics 3.4 (2009): 1403-1447. (Year: 2009) (Year: 2009).*

Aksin, Zeynep, Mor Armony, and Vijay Mehrotra. "The modern call center: A multi-disciplinary perspective on operations management research." Production and operations management 16.6 (2007): 665-688. (Year: 2007) (Year: 2007).*

Gaietto, Molly., "What is Customer DNA?",—NGDATA Product News, Oct. 27, 2015, 10 pages.

Fan et al., "Demystifying Big Data Analytics for Business Intelligence Through the Lens of Marketing Mix", Big Data Research, vol. 2, Issue 1, Mar. 2015, 16 pages.

An et al., Towards Automatic Persona Generation Using Social Media Aug. 2016 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., 2017, 16 pages.

Zhang et al., "A Bayesian approach for modeling and analysis of call center arrivals", 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, 2003, pp. 135-143.

Mandelbaum et al., "Staffing Many-Server Queues with Impatient Customers: Constraint Satisfaction in Call Center", Operations Research, Sep.-Oct. 2009, vol. 57, No. 5 (Sep.-Oct. 2009), pp. 1189-1205.

Fukunaga et al., "Staff Scheduling for Inbound Call Centers and Customer Contact Centers", AI Magazine, Winter, vol. 23, No. 4, 2002, pp. 30-40.

Feldman et al., "Staffing of Time-Varying Queues to Achieve Time-Stable Performance", Management Science, Feb. 2008, vol. 54, No. 2, Call Center Management, pp. 324-338.

Business Wire, "Rockwell SSD announces Call Center Simulator", Feb. 4, 1997, 4 pages.

Nathan, Steams., "Using skills-based routing to the advantage of your contact center", Customer Inter@ction Solutions, Technology Marketing Corporation, May 2001, vol. 19 No. 11, pp. 54-56.

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Diimitrios et al., "An overview of workflow management: From process modeling to workflow automation infrastructure," Distributed and parallel Databases, 1995, vol. 3, No. 2 pp. 119-153.

Grefen et al., "A reference architecture for workflow management systems", Data & Knowledge Engineering, 1998, vol. 27, No. 1, pp. 31-57.

(56) References Cited

OTHER PUBLICATIONS

Huang et al., "Agent-based workflow management in collaborative product development on the Internet." Computer-Aided Design; 2000; vol. 32; pp. 133-144.
Federal Register, vol. 72, No. 195, Oct. 10, 2007, pp. 57526-57535.
Federal Register, vol. 75, No. 169, Sep. 1, 2010, pp. 53643-53660.
Federal register, vol. 79, No. 241 issued on Dec. 16, 2014, p. 74629, col. 2, Gottschalk v. Benson.
Federal Register, vol. 84, No. 4, Jan. 7, 2019, pp. 50-57.
Federal Register, vol. 84, No. 4, Jan. 7, 2019, p. 53-55.
Janarthanam, "Hands on Chatbots and conversational UI development: Build chatbots and voice user interfaces with Chatfuel, Dialogflow, Microsoft Bot Framework, Twilio, and Alexa Skills" Dec. 2017.
https://www.uspto.gov/patent/laws-and-regulations/examination-policy/examination- guidelines-training-materials-view-ksr, signed Aug. 20, 2010.
Myers et al., "At the Boundary of Workflow and AI", Proc. AAAI 1999 Workshop on Agent-Based Systems in The Business Context, 1999, 09 pages.
Niven, "Can music with prosocial lyrics heal the working world? A field intervention in a call center." Journal of Applied Social Psychology, 2015; 45(3), 132-138. doi:10.1111/jasp.12282 ).
On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).
U.S. Appl. No. 16/668,214, Non-Final Office Action dated Nov. 10, 2021.
U.S. Appl. No. 16/668,215, Non-Final Office Action dated Dec. 7, 2021.
United States Patent and Trademark Office, Non-Final Office Action for U.S. Appl. No. 16/550,961 dated Mar. 2, 2020.
United States Patent and Trademark Office, Final Office Action for U.S. Appl. No. 16/550,961 dated Jun. 17, 2020.
Krishnan, Krish, "Data Warehousing in the Age of Big Data", Morgan Kaufmann, Chapter 5, 2013, 28 pages.

\* cited by examiner

100

200

SYSTEMS AND METHODS FOR WORKFORCE MANAGEMENT SYSTEM DEPLOYMENT

CROSS-REFERENCE TO RELATED APPLICATIONS

This application is a continuation of U.S. patent application Ser. No. 16/654,356 filed on Oct. 16, 2019, entitled "SYSTEMS AND METHODS FOR WORKFORCE MANAGEMENT SYSTEM DEPLOYMENT." The contents of which are hereby incorporated by reference.

BACKGROUND

The initial deployment and configuration of a contact center workforce management (WFM) system is a typically time-consuming processes often taking weeks or months. In particular, parameters must be configured to represent external conditions of work to be done, the employees who are expected to do the work, and rules for how the employees can be scheduled to do the work. The inability of WFM systems to configure these items quickly and automatically leads to a large amount of work for WFM administrators to collect, interpret, and input the necessary information.

SUMMARY

A system for quickly deploying WFM systems in contact centers is provided. A user or administrator can quickly install a WFM application on a deployment server. The administrator can provide the WFM application access to the contact center data where the WFM application can import data from the contact center about one or more customers, agents, queues, teams, and any other information or items typically associated with contact centers. The imported data may also include presence data about the agents, teams, and customers. Based on the imported data, the WFM application may execute one or more workflows to automatically determine information such as maximum and minimum hours, break patterns, and shift data about the agents and teams. This information can be used by the WFM system to automatically generate forecasts and schedules.

As may be appreciated, the WFM deployment systems and methods described herein provide many advantages over the prior art. By leveraging the information that is already part of the contact center used by an entity, WFM systems can be easily and quickly deployed without significant input from an administrator. Accordingly, the WFM deployment systems and applications described herein can save these entities significant time and money.

In an embodiment, a method for configuring an application for a contact center is provided. The method includes: interfacing with a contact center by an application; receiving contact center data from the contact center by the application; receiving a selection of an item of the application to configure by the application; based on the selected item, selecting a workflow corresponding to the selected item by the application; and configuring the item of the application automatically using the selected workflow and the contact center data by the application.

Embodiments may include some or all of the following features. The application may be a WFM application. The method may further include: determining a plurality of agents associated with the contact center; and configuring the item of the application automatically using the selected workflow and the contact center data by the application comprises: configuring one or more of a minimum hours for the at least one agent, a break pattern for the at least one agent, and a shift for the at least one agent. The method may further include retrieving presence data for each agent from the contact center, wherein the presence data for an agent comprises a plurality of events and each event is associated with a time. The method may further include: for the at least one agent of the plurality of agents, determining a location for the agent; retrieving one or more rules that relate to scheduling for the determined location; and for the at least one agent of the plurality of agents, generating the schedule for the at least one agent based on the one or more rules and the minimum hours for the at least one agent. Determining a location for the agent may include determining a telephone number associated with the agent and determining the location for the agent based on the telephone number. Interfacing with the contact center by the application may include: requesting credentials from a user associated with the contact center; and interfacing with the contact center using the requested credentials.

In an embodiment, a method for configuring a workforce management system for a contact center is provided. The method includes: interfacing with a contact center by a workforce management system; determining a plurality of agents associated with the contact center by the workforce management system; retrieving presence data for each agent from the contact center by the workforce management system, wherein the presence data for an agent comprises a plurality of events and each event is associated with a time; for at least one agent of the plurality of agents, determining a maximum hours for the at least one agent based on the presence data for the agent by the workforce management system; and for the at least one agent of the plurality of agents, generating a schedule for the at least one agent based on the determined maximum hours by the workforce management system.

Embodiments may include some or all of the following features. The method may further include: for the at least one agent of the plurality of agents, determining a location for the at least one agent; retrieving one or more rules that relate to scheduling for the location; and for the at least one agent of the plurality of agents, determining the maximum hours for the at least one agent based on the presence data for the at least one agent and the one or more rules. Determining the maximum hours for the at least one agent based on the presence data for the at least one agent may include: inferring, from the presence data, a number of hours worked by the at least one agent for each week of a plurality of weeks; and determining the maximum hours for the at least one agent based on the number of hours worked by the at least one agent for each week of the plurality of weeks. The events may include one or more of computer logins, computer logouts, communications, and application activities. The method may further include for the at least one agent of the plurality of agents, determining a minimum hours for the at least one agent based on the presence data for the at least one agent. The method may further include for the at least one agent of the plurality of agents, generating the schedule for the at least one agent based on the determined maximum hours and the determined minimum hours. The method may further include, for the at least one agent of the plurality of agents, determining, based on the presence data, one or more shifts that the at least one agent is available to work, and one or more break patterns associated with the at least one agent. The method may further include generating the schedule for the at least one agent based on the determined maximum hours, the determined one or more shifts that the at least one agent is available to work, and the determined one or more break patterns associated with the at least one agent.

In an embodiment, a method for configuring a workforce management system for a contact center is provided. The method includes: interfacing with a contact center by a workforce management system; determining a plurality of agents associated with the contact center by the workforce management system; retrieving presence data for each agent from the contact center by the workforce management system, wherein the presence data for an agent comprises a plurality of events and each event is associated with a time; for at least one agent of the plurality of agents, determining one or more shifts for the at least one agent based on the presence data for the at least one agent by the workforce management system; and for the at least one agent of the plurality of agents, generating a schedule for the at least one agent by the workforce management system based on the determined one or more shifts.

Embodiments may have some or all of the following features. The method may further include: for the at least one agent of the plurality of agents, determining a location for the agent; retrieving one or more rules that relate to scheduling for the location; and for the at least one agent of the plurality of agents, generating the schedule for the at least one agent based on the one or more rules and the determined one or more shifts. Determining the one or more shifts for the at least one agent based on the presence data for the at least one agent may include: inferring, from the presence data, times worked by the at least one agent for each week of a plurality of weeks; and determining the one or more shifts for the at least one agent based on the times worked by the at least one agent for each week of the plurality of weeks. The events may include one or more of computer logins, computer logouts, communications, and application activities. The method may further include, for the at least one agent of the plurality of agents, determining, based on the presence data, maximum hours for the at least one agent, minimum hours for the at least one agent, and a break pattern associated with the at least one agent. The method may further include generating the schedule for the at least one agent based on the determined maximum hours, the determined minimum hours, the determined one or more shifts that the at least one agent is available to work, and the determined break pattern associated with the at least one agent. Interfacing with the contact center by the workforce management system may include: requesting credentials from a user associated with the contact center; and interfacing with the contact center using the requested credentials.

In an embodiment, a method for configuring a workforce management system for a contact center is provided. The method includes: interfacing with a contact center by a workforce management system; determining a plurality of agents associated with the contact center by the workforce management system; retrieving presence data for each agent from the contact center by the workforce management system, wherein the presence data for an agent comprises a plurality of events and each event is associated with a time; for at least one agent of the plurality of agents, determining a break pattern associated with the at least one agent based on the presence data for the at least one agent by the workforce management system; and for the at least one agent of the plurality of agents, generating a schedule for the at least one agent based on the determined break pattern by the workforce management system.

Embodiments may include some or all of the following features. The method may further include: for the at least one agent of the plurality of agents, determining a location for the agent; retrieving one or more rules that relate to scheduling for the location; and for the at least one agent of the plurality of agents, generating the schedule for the at least one agent based on the one or more rules and the determined break pattern. The method may further include: determining the break pattern associated with the at least one agent based on the presence data for the at least one agent comprises: inferring, from the presence data, breaks taken by the at least one agent for each day of a plurality of days; and determining the break pattern for the at least one agent based on the breaks taken by the at least one agent for each day of the plurality of days. The events may include one or more of computer logins, computer logouts, communications, and application activities. The method may further include, for the at least one agent of the plurality of agents, determining, based on the presence data, maximum hours for the at least one agent, minimum hours for the at least one agent, and one or more shifts that the at least one agent is available to work. The method may further include generating the schedule for the at least one agent based on the determined break pattern, the determined minimum hours, the determined maximum hours, and the determined one or more shifts that the at least one agent is available to work. Interfacing with the contact center by the workforce management system may include: requesting credentials from a user associated with the contact center; and interfacing with the contact center using the requested credentials.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Figure 1:
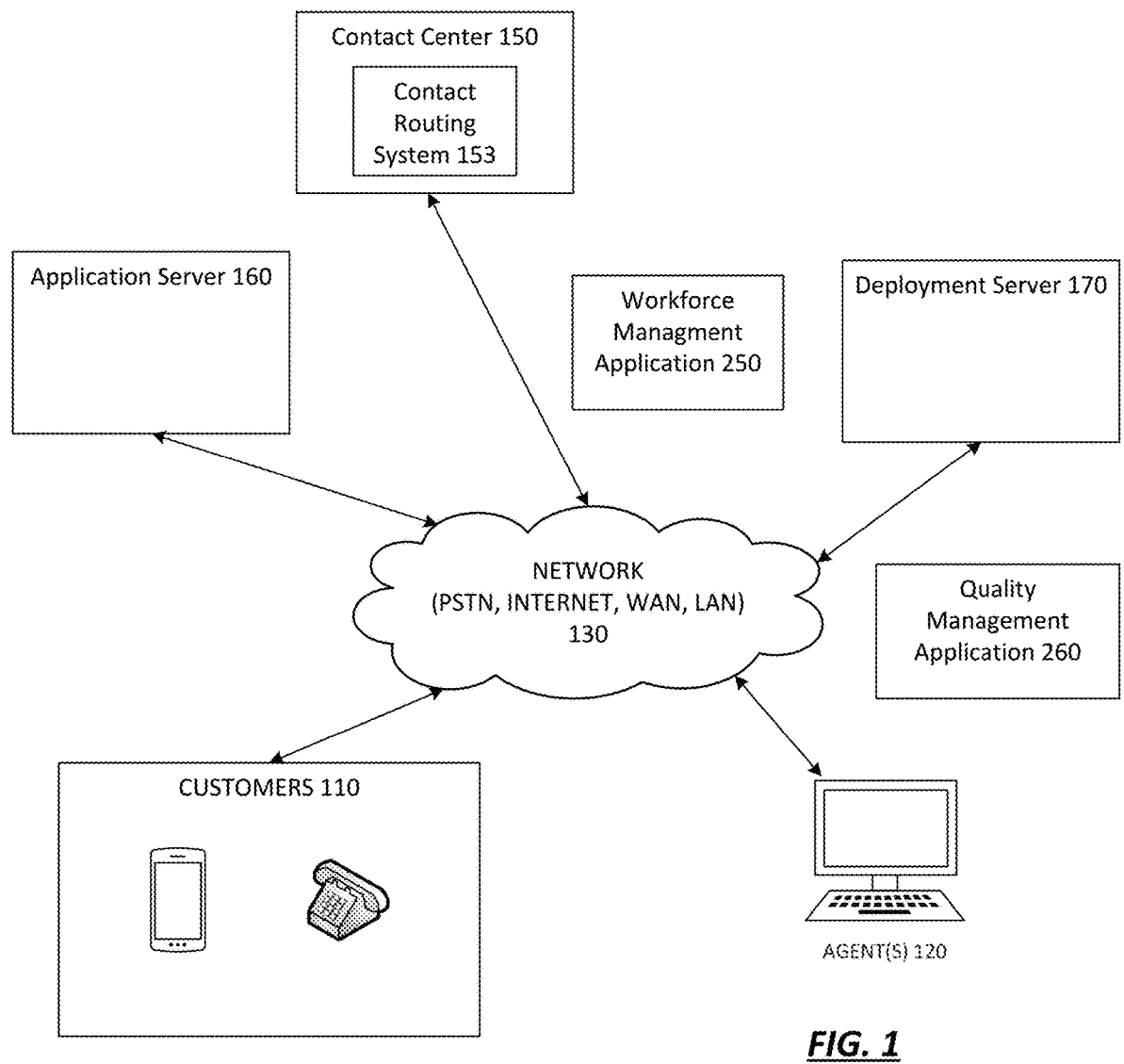
FIG. 1 is an illustration of an example system architecture.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with the agents 120 through a network 130 and one or more of text or multimedia channels. The system that controls the operation of the contact center 150 including the routing and handling of communications between customers 110 and agents 120 for the contact center 150 is referred to herein as the contact routing system 153. Depending on the embodiment, the contact routing system 153 could be any of a contact center as a service (CCaS) system, an automated call distributor (ACD) system, or a case system, for example.

The agents 120 may be remote from the contact center 150 and handle communications with customers 110 on behalf of an enterprise. The agents 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

In some embodiments, the agents 120 may be assigned to one or more queues. The agents 120 assigned to a queue may handle communications that are placed in the queue by the contact center 150. For example, there may be queues associated with a language (e.g., English or Chinese), topic (e.g., technical support or billing), or a particular country of origin. When a communication is received by the contact center 150, the communication may be placed in a relevant queue, and one of the agents 120 associated with the relevant queue may handle the communication.

The agents 120 of a contact center 150 may be further organized into one or more teams. Depending on the embodiment, the agents 120 may be organized into teams based on a variety of factors including, but not limited to, skills, location, experience, assigned queues, associated or assigned customers 110, and shift. Other factors may be used to assign agents 120 to teams.

Entities that employ workers such as agents 120 typically use a WFM system. Typically, WFM systems are used to schedule agents 120 based on workload forecasts. To generate schedules the WFM systems must take into account information such as local employment laws, time and shift preferences of each agent 120, and the skills of each agent 120, for example.

As may be appreciated, initially gathering and providing the information needed to set up a WFM system may be a time-consuming task. Accordingly, to solve this problem, the environment 100 further includes a WFM application 250 that may be used to quickly deploy and configure WFM systems. The workings of the application 250 will be described in further detail with respect to FIG. 2.

Initially, when an administrator associated with a contact routing system 153 desires to set up a WFM system, the administrator may first create or designate what is referred to as a deployment sever 170. The deployment server 170 may implement the WFM system for the contact center 150. Note that depending on the embodiment, the WFM system may be implemented on its own deployment server 170. In addition, some or all of the contact routing system 153 or the WFM system may be implemented together on the same computer, deployment server 170, or cloud-computing environment. An example deployment server 170 is the computing system 900 illustrated with respect to FIG. 9.

After creating the deployment server 170, the administrator may then cause the WFM application 250 to be installed on the deployment server 170 by an application server 160. Depending on the embodiment, the application server 160 may function similar to an "app store" where the administrator of the contact center 150 may view one or more applications (including the application 250) that are available for download. After selecting the WFM application 250, the application server 160 may cause the application 250 to be installed on the deployment server 170.

In order to configure the WFM application 250, rather than have the administrator configure the application 250 from scratch, the application 250 may be configured to interface with, and retrieve data from, the contact routing system 153. As may be appreciated, because the contact routing system 153 already includes data that is relevant to the WFM application 250 (e.g., information on agents 120 such as hours worked and schedules, and information on customers 110 such as communications received), it may be desirable to import the data directly from the contact routing system 153.

After the relevant data has been imported into the WFM application 250, the application may have one or more workflows that can be executed by the administrator to automatically set up and configure the application using the imported data. Each workflow may attempt to configure the application from the imported data with as little input from the administrator as possible. At the end of each workflow, the administrator may be asked to confirm or accept any proposed configurations or settings suggested by the workflow.

For example, there may be workflows that infer, for each agent 120 or team of agents 120, settings for the application 250 such as agent 120 hours, schedules, and work preferences. The particular workflows will be described further with respect to FIG. 2.

As may be appreciated, the embodiments described herein are not limited to configuring the WFM applications 250 using data imported from a contact routing system 153. Other sources of data may be used. For example, the application 250 may import data from a variety of systems including, but not limited to, customer relationship management systems and document management systems. Other systems may be included.

Figure 2:
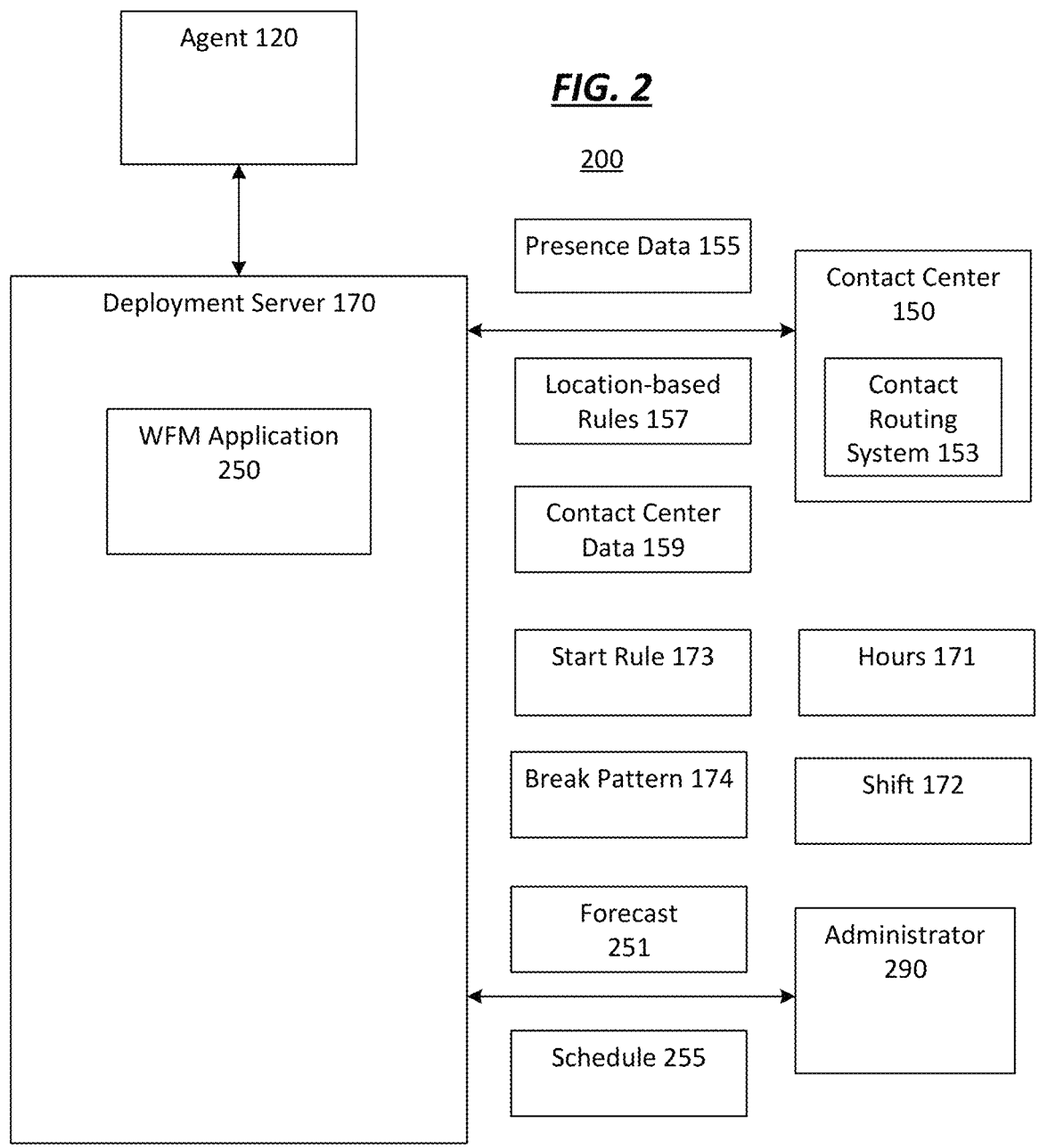
FIG. 2 is an illustration of an example environment for installing and configuring a WFM application.

FIG. 2 is an illustration of an example environment 200 for installing and configuring a WFM application 250. As shown, the environment 200 includes a deployment server 170, a contact center 150 including a contact routing system 153, and an administrator 290. Depending on the embodiment, each of the contact routing system 153, deployment server 170, and administrator 290 may be implemented together or separately by one or more general purpose computing devices such as the computing system 900 illustrated with respect to FIG. 9.

The administrator 290 may cause the WFM application 250 to be installed on the deployment server 170. As part of the configuration process, the administrator 290 may allow the WFM application 250 to access the contact routing system 153. For example, the administrator 290 may provide credentials (e.g., login and password) to the WFM application 250, and the WFM application 250 may use an API to access the contact routing system 153 using the credentials. Other methods for accessing a contact routing system 153 (or other data source) may be used.

The WFM application 250 may initially download contact center data 159 and may begin using the contact center data 159 to configure the WFM application 250 for the administrator 290. Depending on the embodiment, the contact center data 159 may include information about the contact center 150 such as information about the agents 120, teams that the agents 120 are organized into, queues associated with the contact center 150, contacts 110 associated with the contact center 150, skills associated with the agents 120 and queues, historical contact data (e.g., historical data for each queue about the volume of contacts, handling times, etc.), and event types.

The contact center data 159 may further include information such as consistency rules (e.g., rules about whether shifts need to start and stop at the same time), and presence data (e.g., data showing when agents 120 were available to receive communications or interact with customers 110). Other information may be included in the contact center data 159.

The WFM application 250 may use some or all of the contact center data 159 to begin setting up the WFM application 250 for the administrator 290. For example, the WFM application 250 may extract all of the agents 120 associated with the contact center 150 and may enter them into the WFM application 250. The WFM application 250 may similarly, extract information such as the customers 110 associated with the contact center 150, the queues associated with the contact center 150, and any teams associated with the contact center 150.

In some implementations, the WFM application 250 may provide a graphical-user interface (GUI) through which the administrator 290 can review and control what information is imported into the WFM application 250 from the contact center data 159. For example, the WFM application 250 may ask the administrator 290 to confirm each agent 120, contact 110, or team that it extracts from the contact center 150. Depending on the embodiment, the administrator 290 may also use the GUI to add any additional information to the WFM application 250 including any agents 120, customers 110, teams, or queues that the WFM application 250 was unable to extract from the contact center data 159.

As may be appreciated, by initially configuring the WFM application 250 automatically using the contact center data 159, a great amount of time and energy is saved by the administrator 290. Previously, to configure a WFM application 250, the administrator 290 would have had to manually add each agent 120, contact 110, queue, or team to the WFM application 250.

In addition to the automatic importing of certain contact center data 159. The WFM application 250 described herein may use one or more workflows to infer additional WFM application 250 items or settings to further reduce the amount of time that the administrator 290 may spend configuring the application.

The WFM application 250 may use workflows to infer or more items such as minimum or maximum hours 171 for agents 120 individually or as a team, shifts 172 that each agent 120 can work individually or as a team, break patterns 173 associated with each agent 120 or team, and start rules 173 for each agent 120 or team. Other items may be inferred and configured by the WFM application 250 using a workflow.

The WFM application 250 may infer the one or more items from what is referred to herein as presence data 155. Depending on the embodiment, the presence data 155 may include a plurality of events associated with each agent 120 or customer 110, and each event may be associated with a time. For an agent 120, the events may include logging in or out of a computer, receiving or responding to a communication such as an email or telephone call, and updating a record in an application, for example. Other types of events may be supported.

In some embodiments, the presence data 155 may be received from the contact routing system 153 by the WFM application 250. Alternatively, or additionally, the presence data 155 may be extracted from the contact center data 159. The events included in the presence data 155 may be selected by the administrator 290, for example.

For a customer 110, the events may include sending a communication to the contact center 150, receiving a communication from the contact center 150, and interacting with an agent 120. Other types of events may be supported.

In one embodiment, the WFM application 250 may configure various WFM related items on a team-by-team basis. As part of an initial setup procedure, the WFM application 250 may attempt to associate each team with a geographic location. As will be described further below, the location associated with a team (and the agents 120 associated with each team) can be used to determine location-based rules 157 that govern how long agents 120 can work, how many breaks each agent 120 must receive, etc.

The WFM application 250, may for each team, determine the geographic location associated with the team. The WFM application 250 may infer the location of a team using the contact center data 159. For example, the WFM application 250 may determine the location for a team based on the home or work addresses listed for the agents 120 on the team or may determine the location for a team based on the area codes of the phone numbers used by the agents 120 on the team. Alternatively, the WFM application 20 may infer the location based on an address associated with the contact center 150, or an area code of one or more phone numbers associated with the contact center 150. Any method for inferring the locations of agents 120 or employees may be used.

After determining a possible location for a team, the WFM application 250 may present the determined location to the administrator 290 in a GUI. The administrator 290 may either confirm the determined location or may provide a different location using the GUI.

In some embodiments, after the administrator 290 confirms or provides the location, the WFM application 250 may ask the administrator 290, through the GUI, whether all of the teams of the contact center 150 may be associated with the same location. If the administrator 290 affirms that all of the teams may be associated with the same location, the WFM application 250 may associated each team with the location and stop the workflow. Otherwise, the WFM application 250 may continue the workflow and may determine a location for the next team based on the contact center data 159.

After determining the location for each team, the administrator 290 may select another item of the WFM application 250 to configure for a team. One example of such an item may be a minimum and maximum working hours 171 for each agent 120 in a team. Initially, the WFM application 250 may ask the administrator 290 (using the GUI) whether each agent 120 in the team has the same minimum or maximum hours 171. If the administrator 290 answers affirmatively, the WFM application 250 may request the minimum and maximum hours 171 for the agents 120 in the team from the administrator 290. The WFM application 250 may then consider a next team of the contact center 150.

If the administrator 290 answers negatively (i.e., each agent 120 does not have the same minimum or maximum hours 171), the WFM application 250 may use a workflow to determine the minimum or maximum hours 171. In some embodiments, the WFM application 250, for each agent 120 of the team, may use the presence data 155 to determine the minimum and maximum hours 171 for the agent 120.

For example, the WFM application 250 may determine the minimum and maximum weekly hours 171 for an agent 120 by using the presence data 155 to determine events that indicate that the agent 120 was likely working such as computer logins, application usage information, phone usage information, etc. The WFM application 250 may then use the times associated with each determined event to infer, for one or more weeks, the hours that the agent 120 was likely working during the one or more weeks. The maximum and minimum hours 171 for the agent 120 may then be inferred based on the likely hours determined for each of the one or more weeks.

Depending on the embodiment, the WFM application 250 may use the location determined for the team or agent 120, to determine location-based rules 157 that may apply to an agent 120. The WFM application 250 may then ensure that the determined maximum or minimum hours 171 comply with the location-based rules 157. Depending on the embodiment, the location-based rules 157 may include legal rules related to the maximum number of hours that an agent 120 may work in a day or week, as well as entity or contact center 150 policies about the minimum and maximum number of hours that an agent 120 may work during a day or week. For example, an entity such as a corporation may prefer that an agent 120 not work more than some number of overtime hours per week. Depending on the embodiment, the entity or contact center 150 policies may be provided by an administrator 290.

After the WFM application 250 infers maximum and minimum hours 171 for the agents 120 in a team, the WFM application 250 may present the determined maximum and minimum hours 171 for each agent 120 to the administrator 290 through the GUI. The administrator 290 may then accept or modify the determined maximum and minimum hours 171 for each agent 120. The maximum and minimum hours 171 for each agent 120 may be used later by the WFM application 250 to generate one or more schedules 255.

Another example of an item that the WFM application 250 may infer for one or more teams and/or agents 120 using a workflow may be shifts 172 that each agent 120 for a team can work. Depending on the embodiment, the contact routing system 153 of the contact center 150 may schedule agents 120 to one or more of a plurality of shifts 172. Examples of shifts 172 include a morning shift, an afternoon shift, and a night shift. More or fewer shifts 172 may be used by the contact center 150.

Initially, the WFM application 250 may ask the administrator 290 (using the GUI) whether each agent 120 in the team works the same shifts 172. If the administrator 290 answers affirmatively, the WFM application 250 may request the shifts 172 for the agents 120 in the team from the administrator 290. The WFM application 250 may then consider a next team of the contact center 150.

If the administrator 290 answers negatively (i.e., each agent 120 does not work the same shift 172), the WFM application 250, for each agent 120 of the team, may use the presence data 155 to determine the shifts 172 for the agent 120.

For example, the WFM application 250 may determine the shifts 172 for an agent 120 by using the presence data 155 to determine events that indicate that the agent 120 was likely working such as computer logins, application usage information, phone usage information, etc. The WFM application 250 may then use the times associated with each determined event to infer, for one or more weeks, the shifts 172 that the agent 120 was likely working during the one or more weeks. The shifts 172 for the agent 120 may then be determined based on the shifts 172 that the agent 120 was likely working for the one or more weeks.

Similarly as described above, the WFM application 250 may use the location-based rules 157 to ensure that the determined shifts for each agent 120 comply with all local laws and entity policies.

After the WFM application 250 infers the shifts 172 for each agent 120 in a team, the WFM application 250 may present the determined shifts 172 for each agent 120 to the administrator 290 through the GUI. The administrator 290 may then accept or modify the determined shifts 172 for each agent 120.

Another example of such an item that application 250 may infer from the contact center data 159 and/or presence data 155 are start rules 173 for each agent 120 of a team. A start rule 173 for an agent 120 may indicate by how much the time at which the agent 120 begins their work day varies over the week. For example, one agent 120 may start work at the same time every day of the week, while another agent 120 may start at a different time every day of the week. The start rule 173 for an agent 120 may generally indicate how flexible an agent 120 is regarding their start time, and therefore may be considered by the WFM application 250 when generating a schedule 255.

Initially, the WFM application 250 may ask the administrator 290 (using the GUI) whether each agent 120 in the team must start their shift at the same time each day. If the administrator 290 answers affirmatively, the WFM application 250 may request the start time from the administrator 290. The WFM application 250 may then consider a next team of the contact center 150.

If the administrator 290 answers negatively (i.e., each agent 120 does not have the same start-time each day), the WFM application 250, for each agent 120 of the team, may use the presence data 155 to determine the variability of the start times for each agent 120.

For example, the WFM application 250 may determine the different start times for an agent 120 by using the presence data 155 to determine events that indicate that the agent 120 was likely working. The WFM application 250 may then use the times associated with each determined event to infer, for one or more weeks, the different times that the agent 120 likely started each shift.

The different times may be used to construct a start rule 173 for the agent 120. For example, if the WFM application 250 determines that the start times for an agent 120 varies as much as three hours, then the agent 120 may be associated with a start rule 173 that says that the start time for the agent 120 may be varied by at most three hours. In another example, if the WFM application 250 determines that the start times for an agent 120 does not vary at all, then the agent 120 may be associated with a start rule 173 that says that the start time for the agent 120 may not be varied.

After the WFM application 250 infers the start rules 173 for each agent 120 in a team, the WFM application 250 may present the determined start rules 173 for each agent 120 to the administrator 290 through the GUI. The administrator 290 may then accept or modify the determined start rules 173 for each agent 120.

Another example of such an item that the WFM application 250 may infer for each agent 120 of a team is a break pattern 174. The break pattern 174 for an agent 120 may be indicators of when, and for how long, the agent 120 typically takes breaks during a workday or shift including longer breaks such as lunch and shorter breaks such as lavatory breaks, etc.

Initially, the WFM application 250 may ask the administrator 290 (using the GUI) whether each agent 120 in the team must have the same break pattern 174 during their shifts. If the administrator 290 answers affirmatively, the WFM application 250 may request the break pattern 174 from the administrator 290. The WFM application 250 may then consider a next team of the contact center 150.

If the administrator 290 answers negatively (i.e., each agent 120 does not have the same break pattern 174), the WFM application 250, for each agent 120 of the team, may use the presence data 155 to determine the break pattern 174 for each agent 120.

For example, the WFM application 250 may use the presence data 155 to determine events that indicate that the agent 120 has taken a break during their shift or workday. These events may include logging out on an application or workstation, or setting a presence indicator to away, for example. The WFM application 250 may then use the times associated with each determined event to infer, for one or more weeks, the different times that the agent 120 likely took breaks. These times may be used to determine a break pattern 174 for the agent 120. Depending on the embodiment, the WFM application 250 may use the location-based rules 157 to ensure that the determined break pattern 174 for an agent 120 complies with all applicable laws and regulations (e.g., does the agent 120 take enough breaks as required by law), as well as any entity or contact center 150 specific policies.

After the WFM application 250 infers a break pattern 174 for each agent 120 in a team, the WFM application 250 may present the determined break pattern 174 for each agent 120 to the administrator 290 through the GUI. The administrator 290 may then accept or modify the presented break pattern 174 for each agent 120.

The WFM application 250 may further us the contact center data 159 and the presence data 155 to generate one or more forecasts 251 for the contact center 150. A forecast 251 for a contact center 150 may be an estimate or prediction of how busy the contact center 150 will likely be at date or time in the future.

Depending on the embodiment, the WFM application 250 may determine the forecast 251 for the contact center 150 by processing the presence data 155 and contact center data 159 to determine indicators of how busy the contact center 150 was in the past. These indicators can then be used by the WFM application 250 to train a model to predict how busy the contact center 150 will likely be at a future date based on characteristics of the future date like day of the week or proximity to a holiday, for example. Other information may be used to train the model. Depending on the embodiment, the model may be further trained by comparing forecasts 251 generated by the model with actual observed workload data for the contact center 150 for the same dates (e.g., using machine learning).

The WFM application 250 may further generate schedules 255 for the contact center 150 (or team) based on the forecasts 251, and the various items that were inferred for each agent 120 such as maximum and minimum hours 171, shifts 172, break patterns 174, and start rules 173. The WFM application 250 may further consider the location-based rules 157 to ensure that each schedule 255 complies with all laws and regulations as well as entity policies. Any method for scheduling agents 120 may be used.

Depending on the embodiment, the WFM application 250 may present each proposed schedule 255 to the administrator 290 for approval through the GUI. The administrator 290 may either approve the proposed schedule 255, may reject the proposed schedule 255, or may make one or more changes to the proposed schedule 255.

Figure 3:
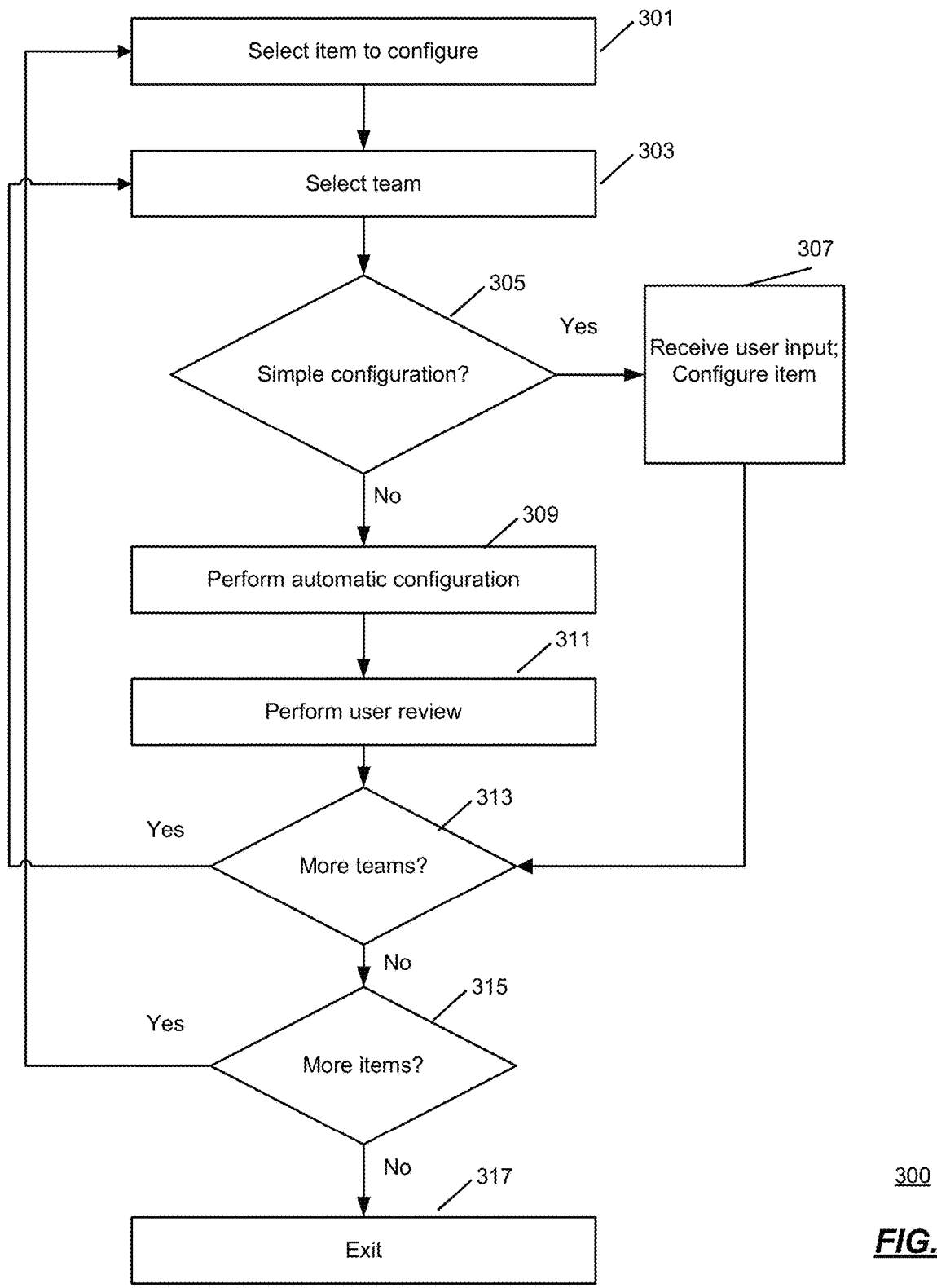
FIG. 3 is an illustration of an example method for configuring a WFM system.

FIG. 3 is an illustration of an example method 300 for configuring a WFM system. The method 300 may be performed by the WFM application 250. Depending on the embodiment, an administrator 290 may have installed the WFM application 250, and the method 300 may configure one or more items of the WFM application 250 using contact center data 159 and presence data 155 automatically downloaded from a contact routing system 153 of a contact center 150.

At 301, an item is selected to configure. The item may be a configurable item or setting of the WFM application 250. The configurable items may include minimum or maximum hours 171, shifts 172, and break patterns 174. Other configurable items may be supported. Depending on the embodiment and items, the items may be configurable per agent 120, per customer 110, or per team, for example. The item may be selected automatically by the WFM application 250, or may be selected by a user (e.g., administrator 290) using a GUI.

At 303, a team is selected. The team may be a group of agents 120 and may be selected by the administrator 290 through the GUI. Alternatively, the team may be selected automatically (i.e., without user input) by the WFM application 250. Depending on the embodiment, the teams may be teams of the contact center 150 and may have been determined from contact center data 159 downloaded from the contact routing system 153. Because the teams were determined from the contact center data 159, the administrator 290 did not have to manually enter the teams (and associated agents 120) into the WFM application 250.

At 305, a determination is made as to whether the selected item has a simple configuration with respect to the team. Depending on the embodiment, the WFM application 250 may make the determination by asking the administrator 290 using the GUI.

Whether or not an item has a simple configuration may be dependent on the item. Generally, an item has a simple configuration if all agents 120 associated with the team have the same value or setting for the item. For example, for an item such as maximum hours 171, the item may have a simple configuration if all agents 120 of the team have the same maximum hours 171 (e.g., 40).

If the administrator 290 indicates that the item has a simple configuration, the method 300 may continue at 307. Else, the method 300 may continue at 309.

At 307, user input is received and the item is configured. Because the configuration was determined to be simple, the item may be configured by the WFM application 250 asking the administrator 290 to provide a value for the item (through the GUI). User input including the value may be received from the administrator 290 and may be used by the WFM application 250 to configure the item for all agents 120 associated with the team.

Continuing the maximum hours 171 example above, the administrator 290 may provide the value "40" as the maximum hours 171 for the agents 120 in the team. The WFM application 250 may then configure the maximum hours 171 to "40" for all agents 120 in the team.

At 309, automatic configuration of the item is performed. The automatic configuration of the item may be performed by the WFM application 250 using one or both of the contact center data 159 or the presence data 155. In particular, the item may be configured by, for each agent 120 of the team, inferring the value of the item from the contact center data 159 or the presence data 155. The value may be inferred using a workflow associated with the item.

Continuing the example above, for an item such as the maximum hours 171, the WFM application 250, for each agent 120 in the team, may analyze the presence data 155 associated with the agent 120 to determine events such as logins and application usage, that may indicate when the agent 120 was likely working. Based on these determined events and their associated times, the WFM application 250 may infer the maximum hours 171 for the agent 120.

At 311, a user review is performed. The user review may be performed by the WFM application 250. Depending on the embodiment, the WFM application 250 may display the proposed configuration for the item with respect to each agent 120 in the team to the administrator 290, and the administrator 290 may approve the configurations, or may provide different values to use for some or all of the proposed item configurations.

At 313, a determination is made of whether there are more teams that the selected item may be configured for. The determination may be made by the WFM application 250. If there are more teams, then the method 300 may return to 303 where a new team may be selected. Else, the method 300 may continue at 315.

At 315, a determination is made of whether there are more items that may be configured. The determination may be made by the WFM application 250. If there are more items, then the method 300 may return to 301 where a new item may be selected. Else, the method 300 may exit at 317.

Figure 4:
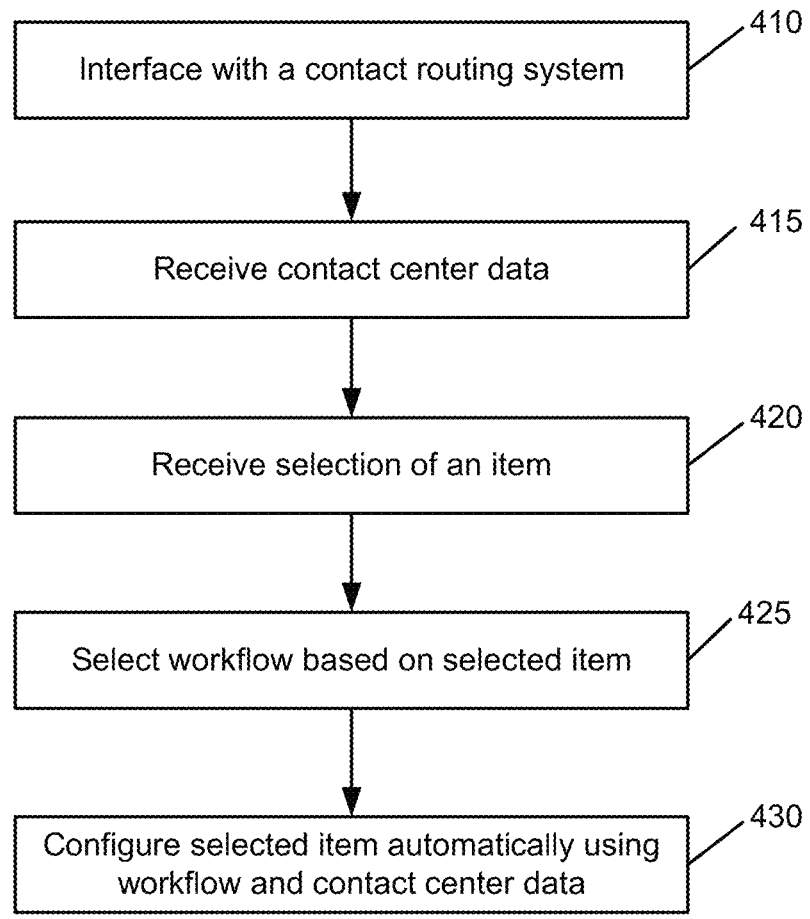
FIG. 4 is an illustration of an example method for automatically configuring items for a WFM application based on data received from a contact center.

FIG. 4 is an illustration of an example method 400 for automatically configuring items for a WFM application 250 based on data received from a contact routing system 153. The method 400 may be implemented by the WFM application 250.

A 410, a contact routing system is interfaced with. The WMF application 250 may interface with the contact routing system 153 using credentials provided by the administrator 290.

At 415, contact center data 159 is received. The contact center data 159 may be received by the WFM application 250 from the contact routing system 153 through the interface.

At 420, a selection of an item to configure is received. The selection of the item may be received by the WFM application 250 from an administrator 290 through a GUI. The GUI may be used by the administrator 290 to configure the WFM application 250.

The selected item may be a configurable item associated with the WFM application 250. The configurable items may include start rules 173, shifts 172, hours 171, and break patterns 174. Other items may be configured. The configurable items may be related to agents 120, teams, or customers 110 associated with the contact center 150.

At 425, a workflow corresponding to the selected item is selected. The workflow may be selected by the WFM application 250 from a plurality of workflows. For example, the WFM application 250 may have separate workflows to configure items such as start rules 173, break patterns 174, and shifts 172.

At 430, the selected item is configured automatically using the selected workflow and the contact center data. The selected item may be configured by the WFM application 250. Depending on the embodiment, the item may be configured also using presence data 155 and one or more location-based rules 157 corresponding to a location of one or more agents 120, teams, or the contact center 150.

Figure 5:
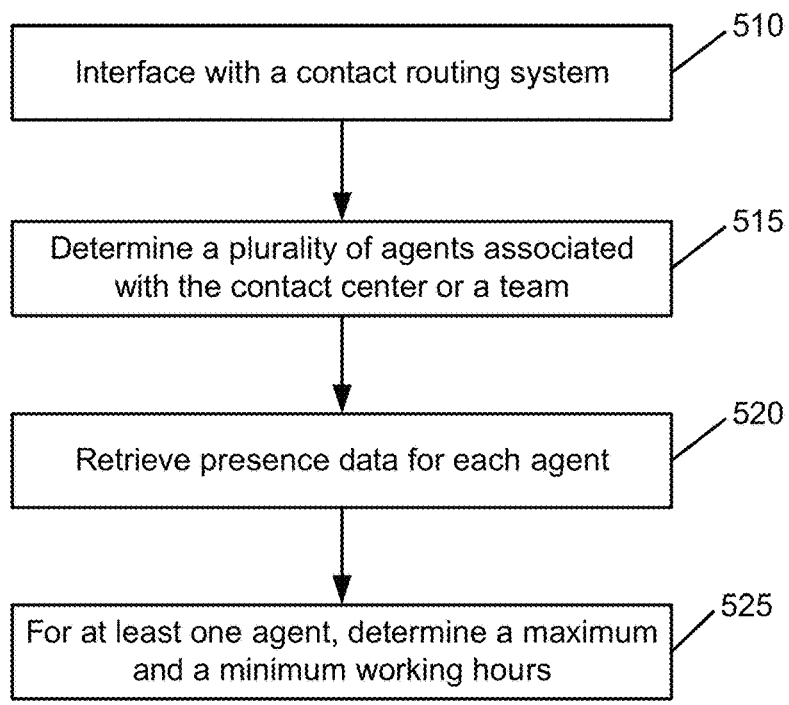
FIGS. 5-7 are illustrations of example methods for automatically configuring a WFM application.

FIG. 5 is an illustration of an example method 500 for automatically configuring a WFM application 250 based on data received from a contact routing system 153 of a contact center 150. The method 500 may be implemented by the WFM application 250.

A 510, a contact routing system is interfaced with. A WFM application 250 may interface with the contact routing system 153 as part of configuring the WFM application 250. In some embodiments, an entity or administrator 290 associated with the contact center 150 may have determined to create and configure a WFM management system for the agents 120 and employees of the contact center 150. Accordingly, the administrator 290 may have caused an instance of the WFM application 250 to be installed on a deployment server 170. The deployment server 170 executing the WFM application 250 may be referred to as the WFM server.

At 515, a plurality of agents associated with the contact center are determined. The plurality of agents 120 may be determined by the WFM application 250 from contact center data 159 received from the contact routing system 153. Depending on the embodiment, the WFM application 250 may further determine teams associated with the contact center 150 and may determine agents 120 associated with each team.

At 520, presence data associated with each agent is received. The presence data 155 may be received by the WFM application 250 from the contact routing system 153. Depending on the embodiment, the presence data 155 for an agent 120 may include a plurality of events, and each event may be associated with a time. Example events may include logging in, or out, or a computer or application, using a particular application, setting a presence indicator to present or away, and handling a communication such as a phone call, email, or text message. Other events may be supported. The presence data 155 may be part of the contact center data 159 or may be received separately from the contact routing system 153.

At 525, for at least one agent of the plurality of agents, a maximum and a minimum hours 171 is determined. The maximum and minimum hours 171 may be determined by the WFM application 250 using the presence data 155 associated with the at least one agent 120.

The maximum hours 171 for an agent 120 may be the maximum hours that the agent 120 is willing to work during some period such as a day, week, month, etc. Similarly, the minimum hours 171 may be the minimum hours that the agent 120 that the agent 120 is willing to work during the period. As may be appreciated, knowing the minimum and maximum hours 171 for each agent 120 is desirable when generating a schedule 255 to ensure that each agent 120 is satisfied with the number of hours that they are assigned.

Figure 6:
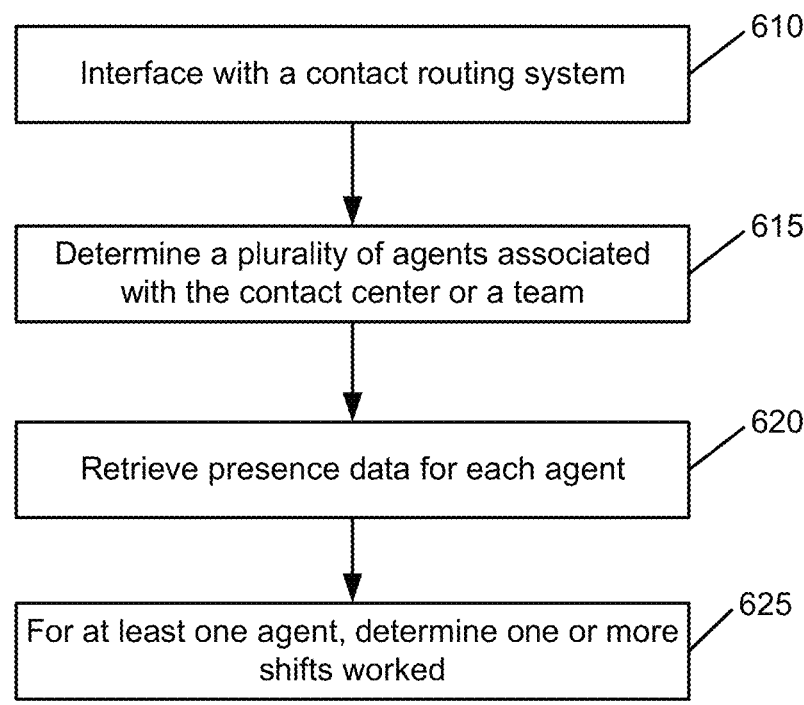

FIG. 6 is an illustration of an example method 600 for automatically configuring a WFM application 250 based on data received from contact routing system 153 of a contact center 150. The method 600 may be implemented by the WFM application 250.

A 610, a contact routing system is interfaced with. A WFM application 250 may interface with the contact routing system as part of configuring the WFM application 250.

At 615, a plurality of agents associated with the contact center are determined. The plurality of agents 120 may be determined by the WFM application 250 from contact center data 159 received from the contact routing system 153. Depending on the embodiment, the WFM application 250 may further determine teams associated with the contact center 150 and may determine agents 120 associated with each team.

At 620, presence data associated with each agent is received. The presence data 155 may be received by the WFM application 250 from the contact routing system 153.

At 625, for at least one agent of the plurality of agents, one or more shifts are determined. The shifts 172 (e.g., morning shift, day shift, or night shift) may be determined by the WFM application 250 using the presence data 155 associated with the at least one agent 120.

The shifts 172 for an agent 120 may be the shifts 172 that the agent 120 typically worked in the past for the contact center 150. As may be appreciated, knowing the shifts 172 for each agent 120 is desirable when generating a schedule 255 to ensure that each agent 120 is only scheduled to work during a shift that they are willing to work.

In some embodiments, the WFM application 250 may determine the shifts 172 using the presence data 155. For example, the WFM application 250 may determine events from the presence data 155 that indicate when the agent 120 was likely working. The WFM application 250 may then determine what shifts of the contact center 150 that the determined events occurred during based on the times associated with the determined events. The shifts with the most associated events may be determined as the shifts 172 for the agent 120. Other methods may be used.

Figure 7:
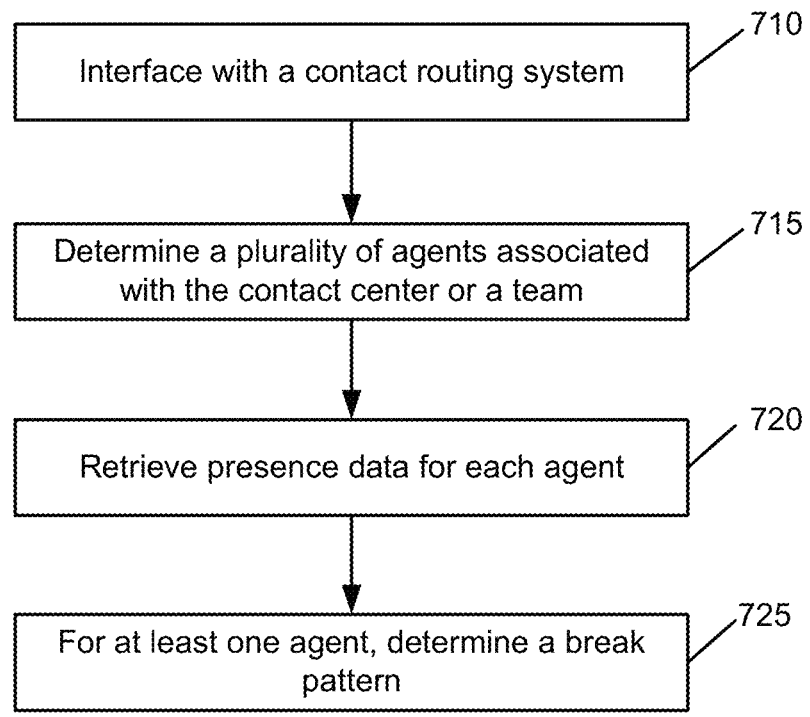

FIG. 7 is an illustration of an example method 700 for automatically configuring a WFM application 250 based on data received from a contact routing system 153 of a contact center 150. The method 700 may be implemented by the WFM application 250.

A 710, a contact routing system is interfaced with. A WFM application 250 may interface with the contact routing system 153 as part of configuring the WFM application 250.

At 715, a plurality of agents associated with the contact center are determined. The plurality of agents 120 may be determined by the WFM application 250 from contact center data 159 received from the contact routing system 153. Depending on the embodiment, the WFM application 250 may further determine teams associated with the contact center 150 and may determine agents 120 associated with each team.

At 720, presence data associated with each agent is received. The presence data 155 may be received by the WFM application 250 from the contact routing system 153.

At 725, for at least one agent of the plurality of agents, a break pattern 174 is determined. The break pattern 174 may be determined by the WFM application 250 using the presence data 155 associated with the at least one agent 120.

The break pattern 174 for an agent 120 may be a data structure that identifies the time and duration of each break taken by the agent 120 during a shift or other period (e.g., day or week). As may be appreciated, the break pattern 174 associated with the agent 120 may be used for generating a schedule 255 so that any breaks that the agent 120 is used to taking are scheduled at their expected times.

In some embodiments, the WFM application 250 may determine the break pattern 174 using the presence data 155. For example, the WFM application 250 may determine events from the presence data 155 that indicate when the agent 120 was likely on break. These events may include logging out of a computer, closing one or more applications or setting a presence indicator to away. The WFM application 250 may then determine the times usually associated with breaks for the agent 120 and may use those times to determine the break pattern 174 for the agent 120. Other methods may be used.

In some embodiments, the WFM application 250 may determine the minimum and maximum hours 171 for a period using the presence data 155. For example, the WFM application 250 may, for previous periods, determine events from the presence data 155 that indicate when the agent 120 was likely working. These events may include when the agent 120 first logged into their computer during a period, and when the agent 120 last logged out from their computer during the period. Average minimum and maximum hours worked by the agent 120 during the periods may be used as the minimum and maximum hours 171 for the agent 120. Other methods may be used.

Figure 8:
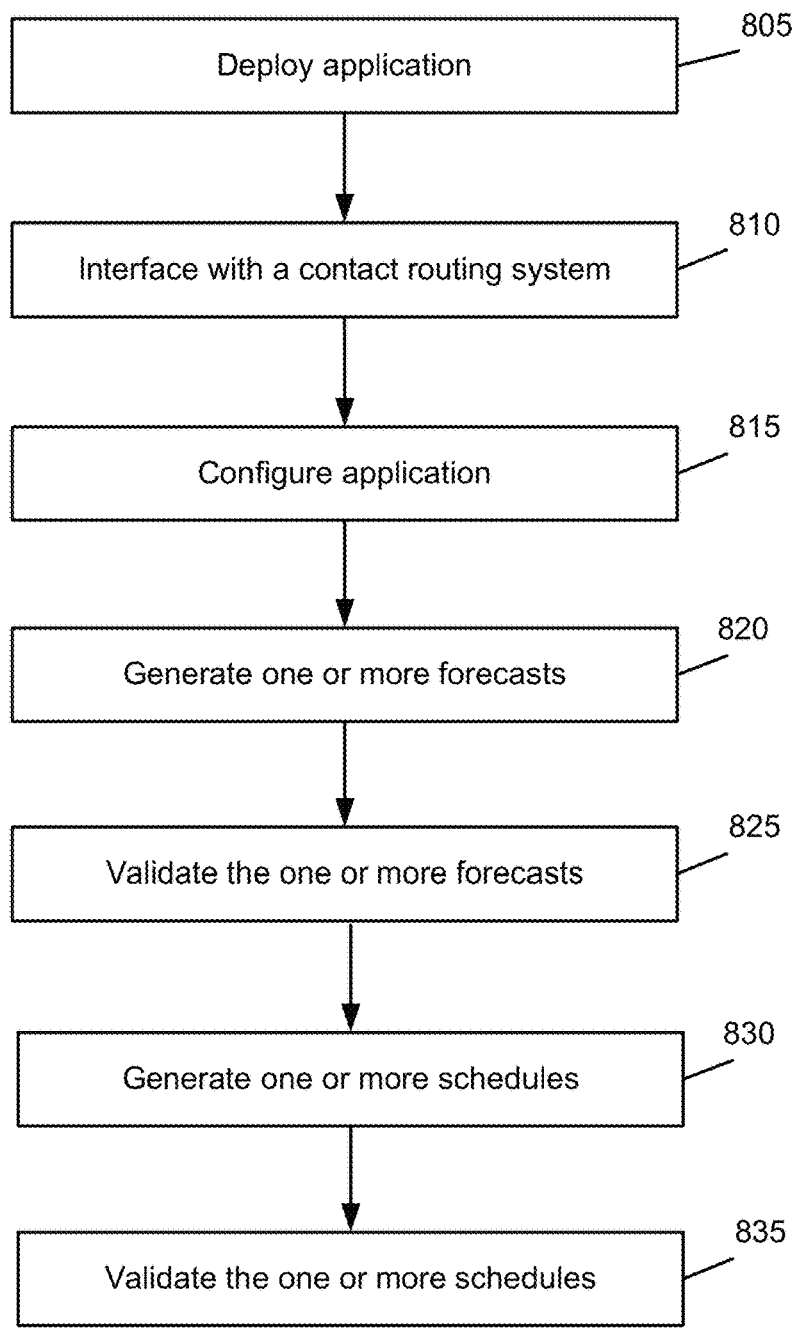
FIG. 8 is an illustration of an example method for automatically configuring a WFM application using workflows and for generating one or more forecasts and schedules.

FIG. 8 is an illustration of an example method 800 for automatically configuring a WFM application 250 using workflows and for generating one or more forecasts and schedules. The method 800 may be implemented by the WFM application 250.

At 805, an application is deployed. The application may be a WFM application 250 and may be deployed on a deployment server 170 by an administrator 290. Depending on the embodiment, the administrator 290 may have selected the application 260 to deploy from a plurality of applications made available by an application server 160.

At 810, a contact routing system is interfaced with. A WFM application 250 may interface with the contact routing system 153 as part of configuring the WFM application 250. The WFM application 250 may import data from the contact routing system 153 such as contact center data 159 and presence data 155. Other types of data may be imported from the contact routing system 153.

At 815, the application is configured. The WFM application 250 may be configured automatically using one or more workflows and the data imported from the contact routing system 153. The items of the WFM application 250 that may be configured using workflows may include teams, locations, queues, event types, historical contact data, agents 120, minimum and maximum hours 171, shifts 172, breaks or break patterns 174, constancy rules (e.g., start rules 173), and agent 120 availability. Other items may be configured.

At 820, one or more forecasts are generated. The one or more forecast 251 may be generated by the WFM application 250. Each forecast 251 may be an indication of how busy the contact center 150 is likely to be at some future time or period (e.g., day, week, or month). The forecast 251 may be generated using historical data about the workload or overall busyness of the contact center 150 during past periods. The historical data may be part of the contact data center data 159, for example. Any method for generating a forecast 251 for a future period based on historical data from past periods may be used.

At 825, the one or more forecasts are validated. The one or more forecasts may be validated by the administrator 290. For example, the one or more forecasts 251 may have been provided to the administrator 290 in a GUI. If the administrator 290 is satisfied by the one or more forecasts 251, the administrator 290 may use the GUI to validate the one or more forecasts.

At 830, one or more schedules are generated. The one or more schedules 255 may be generated by the WFM application 250. Each schedule 255 may be generated for one of the generated forecasts 251 according to the items configured for the application 250 at 815.

For example, the WFM application 250 may generate each schedule 255 such that sufficient agents 120 are scheduled to handle the workload predicted by the associated forecast 251 while also complying with location-based rules 157 associated with the location determined for the agents 120 or the contact center 150. The WFM application 250 may further generate each schedule 255 to honor items such as start rules 173, break patterns 174, hours 171, and shifts 172 determined by the WFM application 250 for each agents 120 or team.

At 825, the one or more schedules are validated. The one or more schedules 835 may be validated by the administrator 290 through the GUI. Depending on the embodiment, after the one or more schedules 255 are validated by the administrator 290 they may be implemented by the contact center 150.

Figure 9:
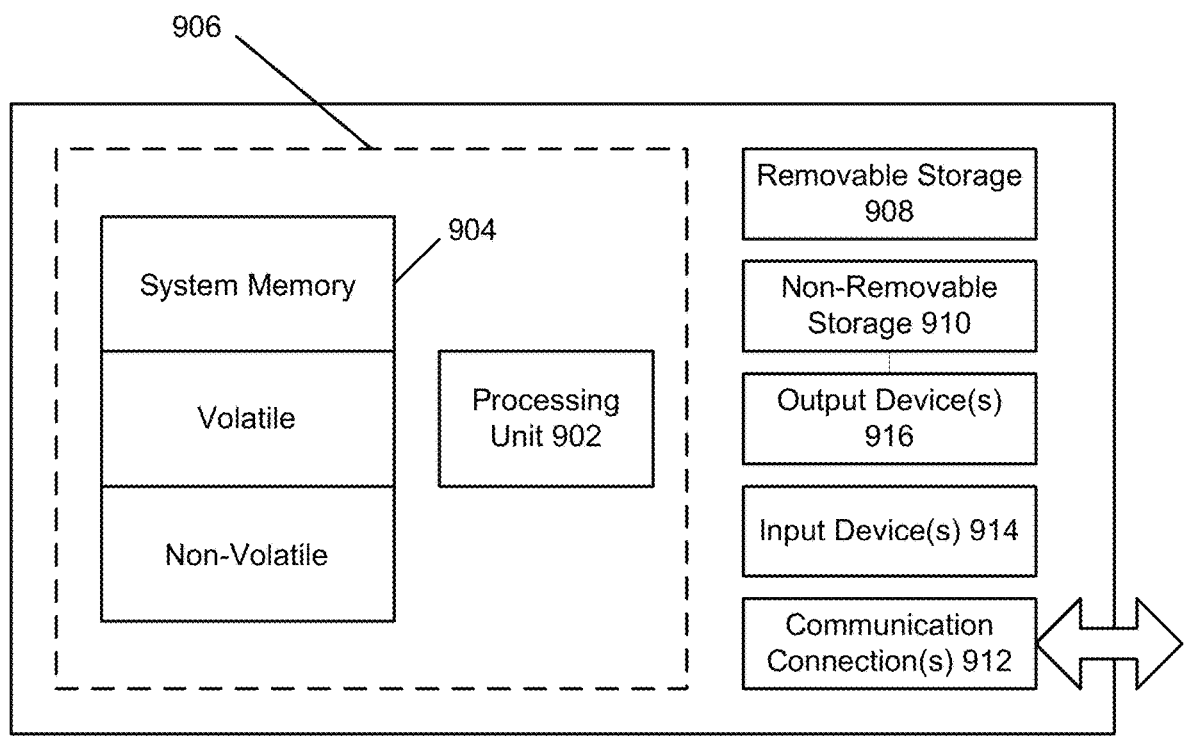
FIG. 9 illustrates an example computing device.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of tangible computer readable media. Computer readable media can be any available tangible media that can be accessed by device 900 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for configuring a workforce management system of a contact center, the workforce management system being operative to create a workforce schedule based on workload forecasts and at least one WFM item, each WFM item indicating at least one parameter of work conditions for agents, the method comprising:

receiving contact center data from a call routing system associated with the contact center, the call routing system being operative to route communications between customers and agents of the contact center wherein the contact center data is received through an interface between the workforce management system and the contract routing system;

determining, by the workforce management system, a plurality of agents associated with the contact center using the contact center data;

receiving, by the workforce management system, presence data for each agent from the call routing system through the interface, wherein the presence data is data indicating when agents were available in the past to the call routing system to receive communications; and for at least one agent of the plurality of agents, automatically configuring one or more WFM items of the workforce management system based on the presence data for the at least one agent, wherein the one or more WFM items are one or more of a team item, a location item, a queue item, an event type item, an historical contact data item, and agent item, a minimum and maximum hours item, a shift item, a breaks or break pattern item, a constancy rules item, and an agent availability item and wherein configuring the one or more WFM items includes setting the at least one parameter of work conditions indicated by the one or more WFM items by the workforce management system, wherein the work conditions represent external conditions of work to be done, the agents expected to do the work, and/or rules for how the agents can be scheduled to do the work, whereby, for the at least one agent of the plurality of agents, a schedule can be generated for the at least one agent by the workforce management system based on the configured one or more WFM items.

2. The method of claim 1, further comprising:
for the at least one agent of the plurality of agents, determining a location for the agent;
retrieving one or more rules that relate to scheduling for the location; and
for the at least one agent of the plurality of agents, generating the schedule for the at least one agent based on the one or more rules and the one or more WFM items.

3. The method of claim 1, wherein the presence data comprises one or more of computer logins, computer logouts, communications, and application activities.

4. The method of claim 1, further comprising:
receiving a selection of the one or more WFM items;
selecting workflows corresponding to each of the selected one or more WFM items; and
automatically configuring the one or more WFM items based on the presence data for the at least one agent using the selected workflows.

5. The method of claim 1, further comprising:
interfacing with a contact center by the workforce management system; and
receiving the contact center data and the presence data through the interface with the contact center.

6. The method of claim 5, wherein interfacing with the contact center by the workforce management system comprises:
requesting credentials from a user associated with the contact center; and
interfacing with the contact center using the requested credentials.

7. A non-transitory computer-readable medium comprising instructions that, when executed by at least one processor, cause a computer system to execute a method for configuring a workforce management system of a contact center, the workforce management system being operative to create a workforce schedule based on workload forecasts and at least one WFM item, each WFM item indicating at least one parameter of work conditions for agents, the method comprising:
receiving contact center data from a call routing system associated with the contact center, the call routing system being operative to route communications between customers and agents of the contact center wherein the contact center data is received through an interface between the workforce management system and the contract routing system;
determining, by the workforce management system, a plurality of agents associated with the contact center using the contact center data;
receiving, by the workforce management system, presence data for each agent from the call routing system through the interface, wherein the presence data is data indicating when agents were available in the past to the call routing system to receive communications; and
for at least one agent of the plurality of agents, automatically configuring one or more WFM items of the workforce management system based on the presence data for the at least one agent, wherein the one or more WFM items are one or more of a team item, a location item, a queue item, an event type item, an historical contact data item, and agent item, a minimum and maximum hours item, a shift item, a breaks or break pattern item, a constancy rules item, and an agent availability item and wherein configuring the one or more WFM items includes setting the at least one parameter of work conditions indicated, wherein the work conditions represent external conditions of work to be done, the agents expected to do the work, and/or rules for how the agents can be scheduled to do the work, whereby, for the at least one agent of the plurality of agents, a schedule for the at least one agent can be generated based on the configured one or WFM more items.

8. The computer-readable medium of claim 7, further comprising instructions that, when executed by the at least one processor, cause the computer system to:
for the at least one agent of the plurality of agents, determine a location for the agent;
retrieve one or more rules that relate to scheduling for the location; and
for the at least one agent of the plurality of agents, generate the schedule for the at least one agent based on the one or more rules and the determined one or more WFM items.

9. The computer-readable medium of claim 7, wherein the presence data comprises one or more of computer logins, computer logouts, communications, and application activities.

10. The computer-readable medium of claim 7, further comprising instructions that, when executed by the at least one processor, cause the computer system to:
receive a selection of the one or more WFM items;
select workflows corresponding to each of the selected one or more WFM items; and
automatically configure the one or more WFM items based on the presence data for the at least one agent using the selected workflows.

11. The computer-readable medium of claim 7, further comprising instructions that, when executed by the at least one processor, cause the computer system to:
interface with a contact center by the workforce management system; and
receive the contact center data and the presence data through the interface with the contact center.

12. The computer-readable medium of claim 11, wherein interfacing with the contact center by the workforce management system comprises:
requesting credentials from a user associated with the contact center; and
interfacing with the contact center using the requested credentials.

13. A system for configuring a workforce management system of a contact center, the workforce management system being operative to create a workforce schedule based on workload forecasts and at least one WFM item, each WFM item indicating at least one parameter of work conditions for agents, the system comprising:
at least one processor; and
a non-transitory computer readable medium comprising instructions that, when executed by the at least one processor, cause the system to:
receive contact center data from a call routing system associated with the contact center, the call routing system being operative to route communications between customers and agents of the contact center wherein the contact center data is received through an interface between the workforce management system and the contract routing system;
determine, by the workforce management system, a plurality of agents associated with the contact center using the contact center data;
receive, by the workforce management system, presence data for each agent from the call routing system, wherein the presence data is data indicating when agents were available in the past to the call routing system to receive communications; and for at least one agent of the plurality of agents, automatically configure one or more WFM items of the workforce management system based on the presence data for the at least one agent, wherein the one or more WFM items are one or more of a team item, a location item, a queue item, an event type item, an historical contact data item, and agent item, a minimum and maximum hours item, a shift item, a breaks or break pattern item, a constancy rules item, and an agent availability item and wherein configuring the one or more WFM items includes setting the at least one parameter of work conditions indicated wherein the work conditions represent external conditions of work to be done, the agents expected to do the work, and/or rules for how the agents can be scheduled to do the work, whereby, for the at least one agent of the plurality of agents, generate a schedule for the at least one agent based on the configured one or more WFM items.

14. The system of claim 13, further comprising instructions that, when executed by the at least one processor, cause the system to:

for the at least one agent of the plurality of agents, determine a location for the agent;

retrieve one or more rules that relate to scheduling for the location; and for the at least one agent of the plurality of agents, generate the schedule for the at least one agent based on the one or more rules and the one or more WFM items.

15. The system of claim 13, wherein the presence data comprises one or more of computer logins, computer logouts, communications, and application activities.

16. The system of claim 13, further comprising instructions that, when executed by the at least one processor, cause the system to:

receive a selection of the one or more WFM items;

select workflows corresponding to each of the selected one or more WFM items; and automatically configure the one or more WFM items based on the presence data for the at least one agent using the selected workflows.

17. The system of claim 13, further comprising instructions that, when executed by the at least one processor, cause the system to:

interface with a contact center by the workforce management system; and receive the contact center data and the presence data through the interface with the contact center.

* * * * *